United States Patent [19]

Tsumura et al.

[11] Patent Number: 5,365,576

[45] Date of Patent: Nov. 15, 1994

[54] DATA AND SPEECH TRANSMISSION DEVICE

[75] Inventors: Mihoji Tsumura; Masato Hata, both of Osaka, Japan

[73] Assignee: Ricos Co., Ltd., Osaka, Japan

[21] Appl. No.: 842,553

[22] Filed: Feb. 27, 1992

[30] Foreign Application Priority Data

Feb. 27, 1991 [JP] Japan .................................. 3-058025
Feb. 27, 1991 [JP] Japan .................................. 3-058026

[51] Int. Cl.$^5$ ............................................. H04M 11/00
[52] U.S. Cl. ........................................ 379/93; 379/97; 348/16
[58] Field of Search ...................... 379/93, 100, 53, 54, 379/96–99; 358/85, 434

[56] References Cited

U.S. PATENT DOCUMENTS

| | | | |
|---|---|---|---|
| 3,873,711 | 3/1975 | Kleinerman et al. | 379/53 |
| 4,436,956 | 3/1984 | Schreiber | 379/98 |
| 4,596,021 | 6/1986 | Carter et al. | 379/98 |
| 4,821,312 | 4/1989 | Horton et al. | 379/97 |
| 4,849,811 | 7/1989 | Kleinerman | 379/97 |
| 4,945,404 | 7/1990 | Miller | 358/85 |
| 4,979,028 | 12/1990 | Minematsu et al. | 358/85 |
| 5,057,938 | 10/1991 | Edamura | 358/434 |
| 5,093,857 | 3/1992 | Yoshida et al. | 379/96 |

Primary Examiner—John K. Peng
Assistant Examiner—Daniel J. Wu
Attorney, Agent, or Firm—Theodore D. Lienesch

[57] ABSTRACT

A device for making efficient use of the free time between speech transmissions and binary coded data transmissions, the device including a switch which will automatically output both the binary coded data and the outgoing speech signals to a telephone line and which will connect to the device, each of the incoming signals received from the telephone line. The device includes an outgoing transmission block and an incoming transmission block. The outgoing transmission block outputs speech signals or data signals selectively after mixing the signals with one of two tone signals of different frequencies. The incoming transmission block first identifies incoming signals by two bandpass filters and then, depending on the identity of the signals, selectively connects the incoming signals either to a speech restoration circuit or to a data restoration circuit.

10 Claims, 5 Drawing Sheets

DATA AND SPEECH TRANSMISSION DEVICE

BACKGROUND OF THE INVENTION

1. Field of the Invention

The invention relates to a device which is designed to make efficient use of the free time between speech transmissions on a connected analog telephone line by also using the line for the transmission of binary coded data. The invention also relates to a switching device which, when binary coded data is to be transmitted along an analog telephone line at the same time as normal speech signals, will automatically output both the binary coded data and the outgoing speech signals to the telephone line while at the same time connecting each of the two types of incoming signals received from the telephone line to their appropriate lines. These type of technique would be particularly effective for the transmission of computer game programs and data using a single subscriber telephone.

2. Description of the Prior Art

Techniques in use today for the transmission of binary coded data down telephone lines are many and varied and include the sorts of techniques used for communication between facsimile machines, for example, and between personal computers.

In the case of facsimile communications, the machine senses the black/white tone difference on the surface of the paper containing the message for transmission and converts this first into a bit image. Next, the bit image is converted into a data string which is then modulated into analog signal form by a modem for subsequent output to a telephone line. Similarly in the case of communications between personal computers, the binary coded signals used by the computer are modulated into analog signal form by a modem and then output to a telephone line. In communications of this type, the user manually sets the sending machine either to voice communication or to data communication and the receiving machine accepts the communication automatically in accordance with the type of signal received. More specifically, on receipt of a calling signal, the receiving machine outputs a stand-by signal for a fixed period of time. If it subsequently receives a data communication identification signal, the machine loads the signals that follow. If no identification signal is received, then the machine automatically switches to voice mode. Since the types of communications outlined above are both currently carried out through the medium of an ordinary analog telephone line, the simple addition of a switching device can clearly facilitate the use of a single line for both speech and data communications. The normal switching relationship employed in this sort of case, however, is fully exclusive in that once one type of communication has been selected, the alternative type cannot then be selected. As a result, in the case of communications between personal computers, for example, both the sender and the receiver must select modem input/output at the same time in order for data transmission to take place and only when the data transmission has been completed can the users return to voice communication mode by, for example, flipping an appropriate switch. This is, needless to say, an irritatingly cumbersome procedure. In order to overcome this problem, it is at present necessary to install two separate lines, one for data communications and the other for speech communications. Moreover, since the timing of inter-computer calls is unpredictable, computers have currently to be kept in stand-by mode with the result that, even though they can be used both for data and for speech communications, they must always be set to give data communications priority over speech communications in much the same way as a facsimile machine. However, the growing use of techniques involving the communication of data by means of telephone lines has inevitably also increased the number of occasions on which it would be useful to a receiving party, for example, to be able to maintain a telephone conversation with the sending party while at the same time monitoring the receipt of a document transmission by facsimile or of a computer data transmission to a visual display unit. The way systems are currently configured, however, makes it necessary to install two separate lines to achieve this result, one line being used exclusively for speech communication and the other exclusively for data. The additional wiring requirement also inevitably increases system costs. In the case of an average household, however, the frequency with which data communications are used is likely to be comparatively low and it is inappropriate therefore to have to install equipment which automatically gives priority to data communications. It would clearly be better for the user if his equipment were designed to dispense with this type of prioritization and treat all incoming calls equally. For instance, in the case of a special purpose network set up specifically to enable a subscriber to access a host computer and download computer game software to his own terminal and subsequently to stop the game at whatever point he wishes and upload the program data for storage in the host computer, there is clearly no need for frequent data communications. It would, therefore, be more convenient for this sort of subscriber if his communications equipment was normally set to a speech communications stand-by mode. Moreover, in the case of computer games, for example, in which the method of play and the basic uses of the program are more or less fixed, it would also be extremely useful if the transmission of the program could be interspersed with verbal instructions to explain to the receiving party what to do next. This is not, however, possible using current systems.

SUMMARY OF THE INVENTION

The present invention has been designed with these problems in mind and it is the main object of the invention to provide a technology which will enable ostensibly simultaneous communication of speech and data by way of a single telephone line. In this way we are aiming to facilitate the transmission of verbal instructions at the same time as the data to which those instructions relate. For this reason, we have paid special attention to the occupancy rate of actual communication time to total connection time in the case of speech communications. Generally speaking, the length of time during which effective communication takes place would appear to be about 30% of total connection time with the remaining 70% of the time remaining unused. The length of time required for data communication, on the other hand, is only very short, particularly in cases in which a high speed modem is used. Thus, by making use of the time when the line is idle to transmit data, it is possible to create the impression of simultaneous transmission of both speech and data.

It is another object of the invention to create a data transmission network which provides for the mutually exclusive output of both speech signals and data signals onto a single line while at the same time providing the incoming transmission side with a data/speech switching technology which is capable of distinguishing rapidly between speech and data signals and of connecting each type of signal to appropriate receiving equipment. It is part and parcel of this same object to provide for the unhindered use of the network for ordinary speech communication purposes. The invention thus makes use of two tone signals each with a different frequency to act as pilot signals to distinguish between data and speech.

It is a further object of the invention to provide a system whereby users of the sort of network outlined above, who normally use their terminals to access data freely from the host computer, are also able to use the network for simultaneous speech communication purposes.

The detailed explanations and drawings below have been added in order to amplify the objects outlined above while at the same time introducing additional objects, features and benefits of the present invention.

DESCRIPTION OF THE PREFERRED EMBODIMENTS:

There follows a description of the preferred embodiments of the invention by reference to the accompanying drawings. We will start by describing a device which has been designed to give the impression of simultaneous transmission of data signals and speech signals. The use of this type of device opens up the possibility of providing a service whereby the receiving party is given verbal instructions, for example, at almost the same moment that the relevant data is transferred to him. Said device is configured in the manner shown in FIG. 1 from an outgoing transmission block 1 and an incoming transmission block 2. Outgoing data D1 and outgoing speech S1 are both input to the outgoing transmission block 1 from which one or other of them is then selectively output to the isolator 3. Incoming signals output from the isolator 3, on the other hand, are input to the incoming transmission block 2 where they are identified either as incoming data D2 or as incoming speech S2 and output to a downstream computer or telephone as appropriate. It is thus possible to carry out simultaneous data and speech transmission by linking two such devices through a telephone line. Outgoing speech S1 and incoming speech S2 are connected to a known telephone set 4 while outgoing data D1 and incoming data D2 are similarly connected to a known computer 5. The function of the isolator 3 is to keep incoming and outgoing signals separate and to output outgoing signals from the outgoing transmission block 1 to the outside telephone line L and to input incoming signals from said outside telephone line L to the incoming transmission block 2.

Figure 1:
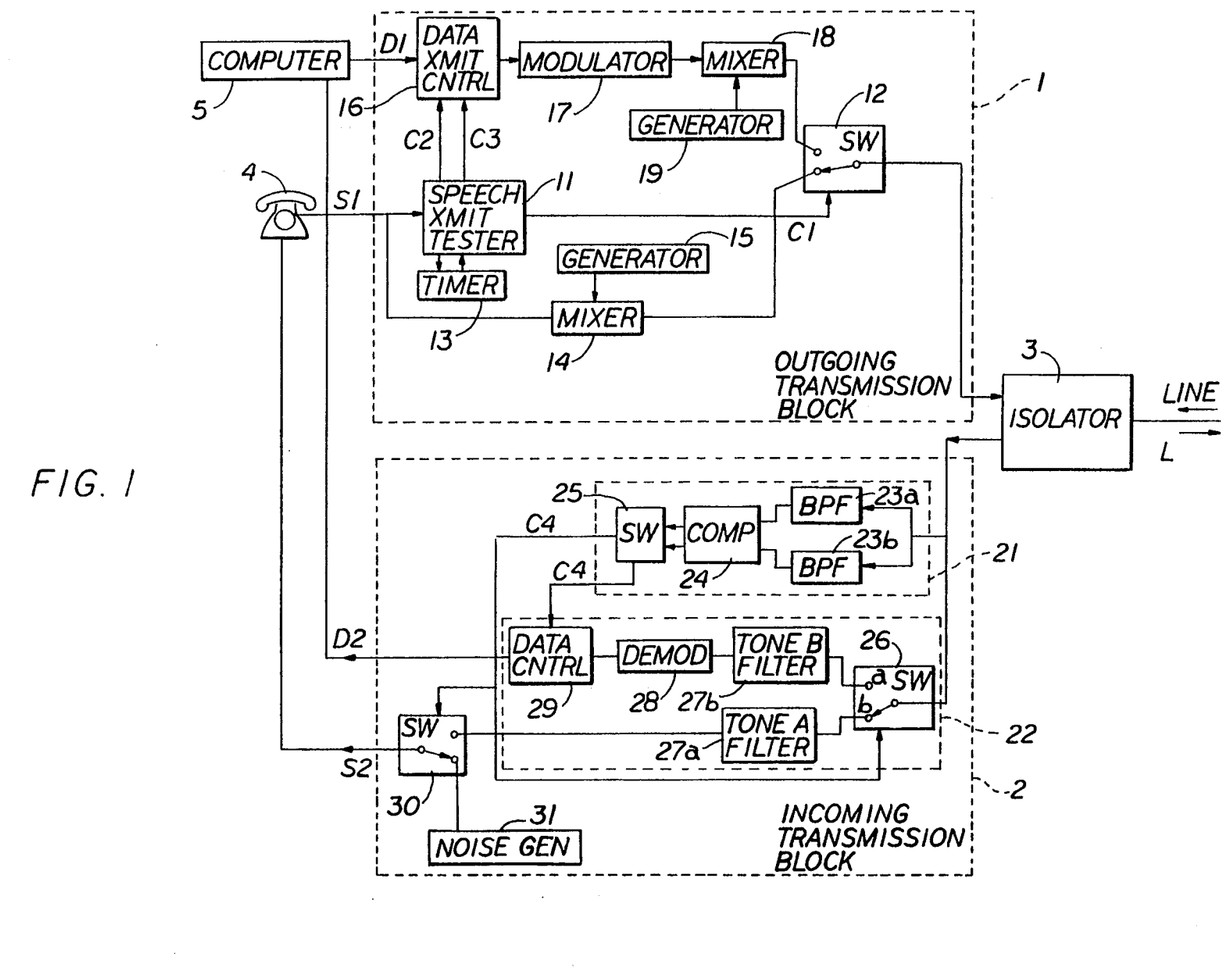
FIG. 1 is a block diagram showing the blocks required to create the impression of simultaneous transmission of speech and data.

The outgoing transmission block 1 is designed to give priority to speech signals while at the same time making use of any period of time when the transmitting party is not speaking for the transmission of data. 11 is a speech transmission tester which determines the presence or otherwise of outgoing speech S1 on the line. Said speech transmission tester 11 operates by setting a threshold noise level above which speech is determined to be present and below which speech is determined not to be present. Said speech transmission tester 11 also outputs a control signal C1 to the switch 12 to switch the circuit. 13 is a delay timer which is used to control the output timing of the control signal C1 in cases where it is determined that there is no speech present on the line. The timer 13 is needed because, while it is essential in cases where there is outgoing speech S1 on the line to set the switch immediately to prevent the beginning of the speech stream from being lost, it is equally important to ensure that perfect data transmission conditions are also maintained. The point is that, while it is generally speaking rare for a speech flow to continue without a break, there are nevertheless many small breaks when there is no speech present on the line and, if the speech transmission tester 11 faithfully records each of these breaks, however short, then the switch 12 will be almost continually switching between circuits. This will not only impair the flow of speech sounds but it will also prevent the establishment of adequate data transmission conditions. The timer 13 thus delays the changing of the switch 12 to the data transmission circuit for a fixed period of time, thereby ensuring not only that data transmission takes place only when then is a lengthy break in the flow of speech but also that, by switching immediately, the flow of speech sounds is always transmitted smoothly.

Outgoing speech S1 is input to a mixer 14 where it is combined with a tone signal A, which has been generated by the tone generator 15, and subsequently output to one of the switch 12 terminals.

16 is a data transmission controller. When the speech transmission tester 11 determines that there is no speech present on the line then, after a fixed delay time has elapsed, the timer 13 outputs a transmission enabling signal C2 to said data transmission controller 16 which releases the data signal D1 in response. Said data signal D1 is then modulated in a modulator 17. In order to ensure automatic release when data transmission is interrupted by speech transmission, the data transmission controller 16 also carries out identification and error control. When, on the other hand, the speech transmission tester 11 determines that there is speech present on the line, it immediately outputs a transmission interrupt signal C3 in order to interrupt the transmission of data. In the meantime, data is held temporarily either in the data transmission controller 16 or else in an upstream buffer. Said data is released, however, on receipt either of a transmission enabling signal C2 or of a transmission interrupt signal C3. At the same time, modulated data is also being combined in the mixer 18 with a tone signal B, which has been generated by the tone generator 19, and then output to one of the switch 12 terminals. The tone signals A, B function as pilot signals which indicate whether the following mixed signals are either outgoing data D1 or outgoing speech S1. The incoming transmission block 2 can be broadly divided into a signal identification means 21 and a signal extraction means 22. Within said signal identification means 21 there are two band-pass filters 23a, 23b, which have as their center frequencies the frequencies corresponding to tone A and tone B respectively. Signals received from the telephone line L are duly passed through each of these two band-pass filters from which they are then input to a comparator 24. The comparator 24 compares the signals received from the two band-pass filters 23a, 23b in order to ascertain which one is at a high level. The signal at the high level is then determined to be the tone signal of the stream of signals just received and this is reported to the data/speech switch 25 further downstream. In other words, if the signal output by the band-pass filter 23a is the high level signal then the signals received are determined to be speech signals because they include tone signal A and a corresponding control signal is output to the data/speech switch 25. If, on the other hand, the signal output by the band-pass filter 23b is found to be the high level signal then the signals received are determined to be data signals because they include tone signal B and a corresponding control signal is similarly output to the data/speech switch 25.

At the same time the incoming signal is connected to the central contact point of the dual contact incoming transmission switch 26, which is located at the most upstream point in the signal extraction means 22. From contact "a" the signal is passed through the data restoration circuit, comprising a tone B filter 27b, a demodulator 28 and an incoming data controller 29, where it is restored to the form of incoming data D2 and input to the computer. From contact "b", on the other hand, the signal is passed through a tone A filter in order to restore it to the form of incoming speech signal S2 after which it is output to a telephone 4, which is connected further downstream. Connected into the circuit between the tone A filter 27a and the telephone 4 there is a switch 30 to the second terminal of which is connected an artificial noise generator 31, which is used generate natural noise on the line to the telephone 4 in order to prevent the sort of silences which would otherwise occur when data was being received and there was no speech signal present on the line. The tone A filter 27a, the switch 30 and the artificial noise generator 31 together constitute the speech restoration circuit. The incoming signal switch 26 and switch 30 are in turn controlled by control signal C4 output by the data/speech switch 25. The incoming data controller 29 is also controlled by the same control signal C4. In the same way as the data transmission controller 16, the incoming data controller carries out identification and error control in order to ensure automatic switch release whenever a data transfer is interrupted by a speech transfer. Incoming data can thus be restored in completely error free form.

Figure 2:
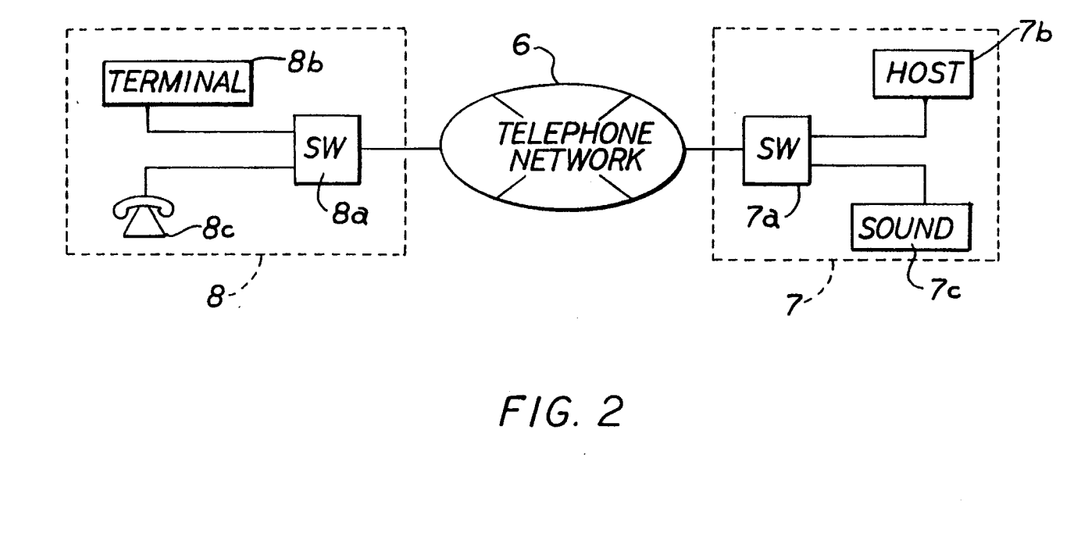
FIG. 2 is a block diagram of a communications network which uses the configuration illustrated in FIG. 1.

FIG. 2 is a practical example of the configuration illustrated in FIG. 1 incorporated into a network. In this example, a host device 7 and a terminal device 8 are connected through the medium of a telephone network 6. The host device 7 includes the switching device 7a of the present invention, a host computer 7b and a speech device 7c while the terminal device 8 also includes the switching device of the present invention 8a along with a terminal computer 8b and a telephone 8c. The adoption of this sort of configuration enables access of the host device 7 from the terminal device 8 and the simple input of requests for the download of, for example, game programs stored in the host computer 7b. In this sort of case, it would also be possible for spoken game instructions or even an explanation of the procedure for using the system itself to be issued from the speech device 7c while the program was in the process of being transferred, thereby ensuring a highly efficient use of the total transfer time. The network can, moreover, be configured freely to enable the input of download requests either from the telephone 8c or from the terminal computer 8b.

Figure 3:
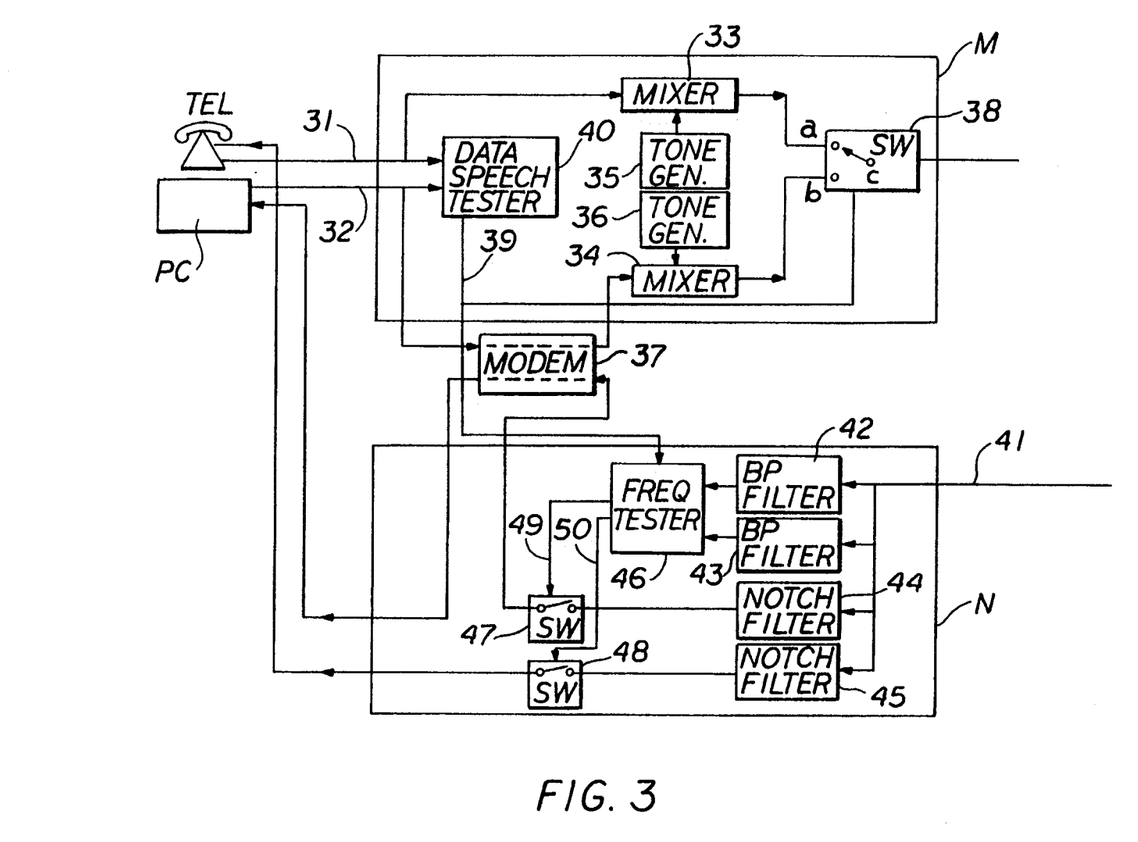
FIG. 3 is a block diagram illustrating the configuration for determining whether an incoming or outgoing signal is a data signal or a speech signal and for subsequently switching said signal through to an appropriate piece of equipment.

There now follows a description of the data and speech signal identification and switching configuration which constitutes one of the central features of the present invention. This configuration enables the use of a single analog line for both data and speech communications without the imposition of any serious limitation on the speech communication function. FIG. 3 is a block diagram showing the internal configuration of a data/speech switching device in which the abbreviation PC represents a terminal computer and the abbreviation TEL stands for telephone. On the outgoing transmission side M, 31 is a speech signal and 32 is a binary coded data string, each of which is input to the mixers 33 and 34 respectively. The mixers 33, 34 are each in turn connected to the tone generators 35, 36, which are used to generate the tone signals X and Y, each of which has a different frequency. The mixer 33 is used to combine speech signals with the tone signal X while the mixer 34 is similarly used to combine data signals with the tone signal Y. The tone signals X and Y function as pilot signals which are used to identify speech signals and data signals respectively and are set at frequencies towards the upper limit of the telephone line's carrier wave band. This approach is adopted in order to prevent the tone signals from interfering with speech signals by keeping to a part of the speech signal spectral distribution which is as low as possible. The mixer 34 is used to combine the data string 32 with an analog wave and the data string is therefore input to the mixer 34 as soon as it has been modulated to analog data signal form by the modem 37. The modem 37 uses the AFSK (audio frequency shift keying) method to modulate the data string, thereby ensuring a minimal error rate. The output of each of the mixers 33 and 34 is connected to contacts a and b respectively of switch 38. The central contact point c of the switch 38 is in turn connected to the outgoing telephone line and the switching operation of the central contact point c is triggered by a control signal 39. The control signal 39 is output by the data/speech tester 40 which distinguishes between analog speech signal input and digital data string input and operates the switch 38 accordingly. The switch 38 could, of course, be operated in a variety of different ways. One choice would be to set the switch 38 constantly to contact a (thereby keeping contact a and the central contact point c constantly connected) and have it only switch to contact b on receipt of output from the tester 40 indicating that there is a data signal awaiting transmission. Using this sort of configuration, the speech communication related operations carried out by the user would be identical regardless of whether the user was accessing the network in his capacity as a network subscriber or simply accessing the regular telephone network.

There now follows a detailed description of the switching configuration N which is used for incoming signal reception. Incoming transmission input 41 is input in parallel to the two band-pass filters 42, 43, each of which has a different center frequency, while at the same time also being input in parallel to the two notch filters 44, 45, which have center frequencies corresponding to one or other of the tone signals X and Y, which are added to speech and data signals respectively. The output of the band-pass filters 42, 43 is in both cases input to the frequency tester 46 while the output of the notch filters 44, 45 is connected to each of the single contact switches 47, 48 respectively. The frequency tester 46 also outputs two control signals 49, 50 to switches 47 and 48 respectively. There is, of course, a close connection in terms of frequency between the tone generators 35, 36, which are incorporated into the transmission switching configuration M and the band-pass filters 42, 43 and notch filters 44, 45. To be more precise, the center frequency of tone signal X, which is combined with speech signals, is matched to the center frequency of both the band-pass filter 42 and the notch filter 44. Similarly, the center frequency of tone signal Y, which is combined with data signals, is matched to the center frequency of both the band-pass filter 43 and the notch filter 45. As a result, in cases where a signal transmitted from a switching device Ax, which is installed on another subscriber telephone line, is a speech signal and since said speech signal overlaps with tone signal X, the high level tone signal which passes through the first pass-band filter 42 of the two pass-band filters 42, 43 will be input to the frequency tester 46. Even if there are frequency elements corresponding to tone signal Y which get past band-pass filter 43 and are also input to the frequency tester 46, the extremely low level of the signal will make it easy to distinguish the one from the other. It will thus be readily determined what kind of tone signal has been input and control signal 50 will be output to close switch 48. The speech signal, from which the tone signal X element has been eliminated during its passage through the notch filter 45, is now output by way of the closed switch 48 to the telephone further downstream.

The speech signal will also, of course, be passed in parallel through the notch filter 44 from which it will be output after being stripped of the signal elements which correspond to the tone signal Y. However, since the switch 47 remains open, the signal cannot be output to a downstream computer or other piece of equipment.

If, on the other hand, the signal transmitted from another subscriber telephone line switching device is a data signal, the signal passing through band-filter 43 will be at a higher level than that output from band-filter 42 with the result that, when it is input to the frequency tester 46, the tester will determine the waiting signal to be a data signal and output the control signal 49 to close the switch 47 to complete the circuit. The data signal, which has now been stripped of elements corresponding to the tone signal Y by passage through the notch filter 44, is input by way of the switch 47 to the modem 37 from which it is subsequently output to a downstream computer or other piece of equipment in the form of a binary coded data string. In this case, the signal which has been output from notch filter 45 is prevented from traveling further downstream by the switch 48 which remains open. In order to give priority to speech signals, a constant relationship should be maintained between switch 48, which should be kept constantly closed, and switch 47, which should be kept constantly open. By ensuring that the constant relationship between the two switches 47, 48 is reversed (in unison) only to allow the passage of data signals, the system can be made to respond effectively to calls originated outside the network as well as inside.

The control signal 39 output by the data/speech tester 40 is also input to the frequency tester 46. This is done in order to prevent said frequency tester 46 from operating incorrectly in the event of cross-talk caused by the processing of internally transmitted signals. It would, however, be possible to dispense with this feature by taking alternative steps such as setting the threshold value of said tester 46 to a high level, for example, to prevent this kind of operating fault. The system is thus configured not only to enable the reliable selective transmission of two different types of signal by the outgoing transmission side but also to allow the testing and selective onward transfer to downstream equipment of signals received on the incoming transmission side by way of a telephone line.

Figure 4:
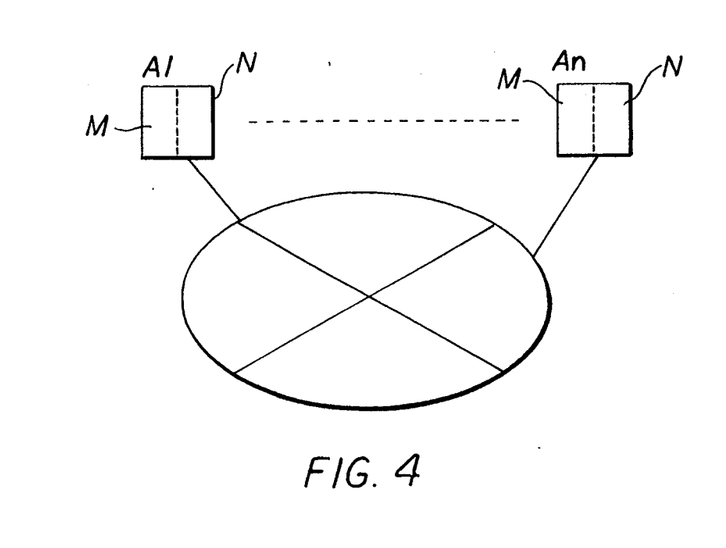
FIG. 4 is a block diagram of a network which uses the configuration illustrated in FIG. 3.

FIG. 4 illustrates the construction of a network using existing telephone lines. A1 to An represent a plurality of independent data and speech switching devices of the present invention, each of which is connected by an incoming and an outgoing line to a telephone network. Moreover, the devices A1-An each comprise an outgoing transmission switching side M and an incoming transmission switching side N. The data and speech switching device A is also connected in parallel to a telephone and a computer (not shown in the drawing) and carries out the input and output of data strings and analog signals to these pieces of equipment.

Figure 5:
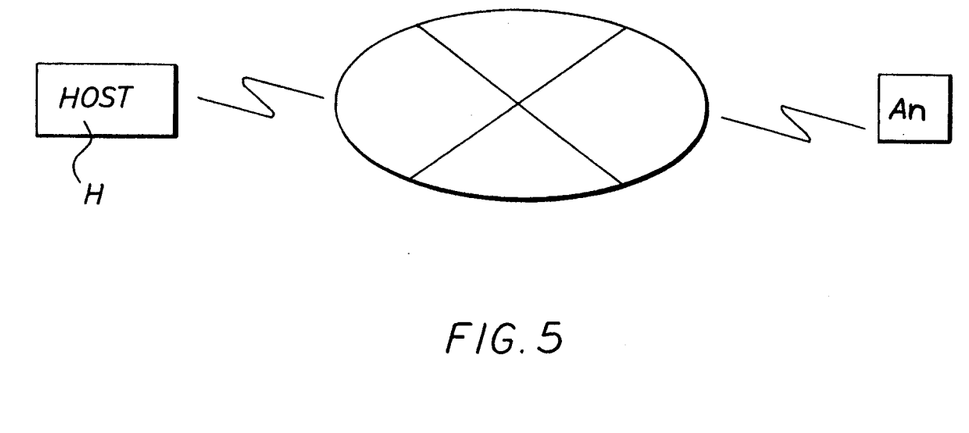
FIG. 5 is a block diagram of another network which also uses the configuration illustrated in FIG. 3.

FIG. 4 shows a general purpose network configuration in which the devices A1-An each have equal connection to the telephone network NW. FIG. 5, on the other hand, illustrates the structure of a computer network. In the figure, H is a host computer in which is stored a plurality of programs and data including computer game programs and karaoke music data. A special purpose network can thus be constructed by connecting the devices An of this invention through the medium of the telephone network NW. With the help of this configuration, a user terminal incorporating one of the devices An can be used to access the host computer H to request a data download, for example, or to upload and save data relating to an unfinished game. The device An would automatically choose between speech communication and data communication.

What is claimed is:

1. A data and speech transmission device comprising:
an outgoing transmission block having a speech transmission tester for detecting input of speech signals and on receipt of said speech signals simultaneously issuing a transmission interrupt signal, a data transmission controller for receiving data signals, said data transmission controller being connected to said speech transmission tester for receiving said transmission interrupt signal, a timer connected to said speech transmission tester for outputting a transmission enabling signal to said data transmission controller a fixed period of time after said speech transmission tester has detected an absence of said speech signals input, means for generating two tone signals each of said tone signals having a different frequency, a first mixing means for mixing said speech signals with one of said tone signals, and a second mixing means for mixing said data signals with a second one of said tone signals, said second mixing means being connected to said data transmission controller for receiving said data signals, a switch connected to said speech transmission tester for selectively outputting said mixed speech signals and said mixed data signals to a telephone line in response to a control signal from said speech transmission tester; and an incoming transmission block connected to said outgoing transmission block for receiving incoming speech and data signals, said incoming transmission block including two band-pass filters for receiving said incoming signals, each of said filters corresponding in frequency to one of said two tone signals, a comparator connected to said filters for identifying signals output from said filters, an incoming transmission switch for receiving said incoming signals, a speech restoration circuit and a data restoration circuit, said restoration circuits being connected to said incoming transmission switch, and a data and speech controller connected to said comparator, said controller outputting a control signal to said incoming transmission switch for selectively connecting said incoming signals either to said speech restoration circuit or said data restoration circuit, whereby said incoming signals are restored to their original form for input to a telephone or a computer, respectively.

2. The data and speech transmission device according to claim 1 wherein said outgoing transmission block and said incoming transmission block are connected by an isolator which in turn is connected to a telephone line.

3. The data and speech transmission device according to claim 1 in which said timer functions as an output timing delay means for said data signals only, said timer having no processing function in respect of timing of output of said speech signals.

4. The data and speech transmission device according to claim 1 in which said two tone signals are both set to frequencies close to an upper limit value of a telephone line carrier wave band.

5. The data and speech transmission device according to claim 1 in which an artificial noise generator transmits noise to a telephone receiver whenever said data signals are being received.

6. The data and speech transmission device according to claim 1 wherein said device is connected by way of a telephone network to a host computer, said host computer including speech signal output means.

7. A data and speech transmission device comprising:

first mixing means for combining a first tone signal with analog speech signals;

second mixing means for combining a second tone signal of different frequency with digital data strings after said data strings have been converted to analog data signals;

a first switching device connected to said first and second mixing means for selectively transmitting either said speech or said data signals to a telephone line;

a second switching device connected to said telephone line for receiving incoming signals, said second switching device including two notch filters, each of said notch filters corresponding in frequency to one of said two tone signals, said notch filters being connected to receive said incoming signals;

two band pass filters, each of said band pass filters corresponding in frequency to one of said two tone signals, said band pass filters being connected to receive said incoming signals from said telephone line;

a frequency tester, connected to said band pass filters for determining a tone signal frequency for said incoming signals and generating a control signal; and said second switching device receiving said control signal from said frequency tester and in response to said control signal, selectively outputting signals from one of said notch filters which matches said incoming tone signal frequency, whereby said signals are input either to a telephone or a computer, depending upon said selection of said second switching device.

8. The data and speech transmission device according to claim 7 in which both said first switching device and also said second switching device are normally connected to enable the input and output of said speech signals.

9. The data and speech transmission device according to claim 7 in which said second switching device remains connected to the incoming speech side whenever the two tone signals included as part of the incoming signal elements remain below a specified threshold level.

10. The data and speech transmission device according to claim 7 which is connected by way of a telephone network to a host computer.

* * * * *